Patented Sept. 1, 1953

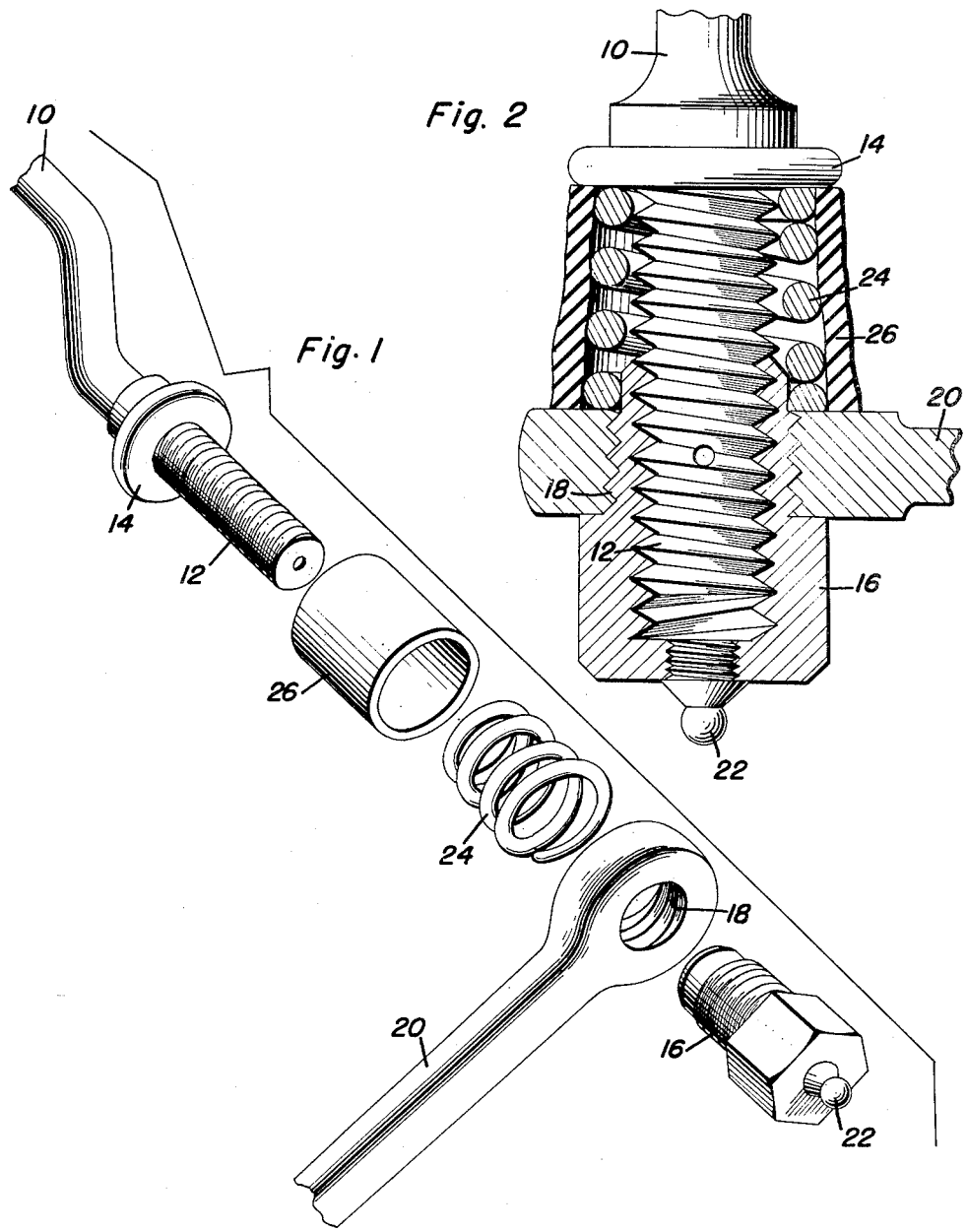

2,650,844

UNITED STATES PATENT OFFICE 2,650,844

AUXILIARY STEERING ARM STABILIZER SPRING

John J. Shemorry, Williston, N. Dak.

Application March 27, 1950, Serial No. 152,078

1 Claim. (Cl. 287—93)

This invention relates to new and useful improvements in motor vehicles and more particularly to the auxiliary steering arm as used on some American built motor vehicles.

The primary object of the present invention is to provide a device for stabilizing the various working parts of the auxiliary steering arm of a motor vehicle.

Another important object of the present invention is to provide an attachment for the auxiliary steering arm of a motor vehicle that will eliminate or reduce the wear on the various parts of the auxiliary steering arm.

Yet another object of the present invention is to provide a device for eliminating rattling between the various parts of an auxiliary steering arm for vehicles.

A further object of the present invention is to provide a resilient member for eliminating vibration between the various parts of an auxiliary steering arm.

A still further aim of the present invention is to provide a device of the aforementioned character that is simple and practical in construction, strong and reliable in use, convenient to apply to or remove from an auxiliary steering arm, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary group perspective view of an auxiliary steering arm together with the instant stabilizer spring and spring protector; and, Figure 2 is a sectional view of an auxiliary steering arm and showing the present invention in section applied thereto.

Referring now to the drawings in detail, wherein for the purpose of illustration, there is disclosed a preferred embodiment of the present invention, the numeral 10 represents an auxiliary steering arm mounting bracket having a threaded end portion 12 and a shouldered portion 14 adjacent the threaded end portion 12.

An externally threaded sleeve 16 is threaded in an internally threaded opening 18 in a front axle steering or actuating arm 20. The sleeve 16 is also internally threaded to receivably engage the end portion 12. A grease fitting 22 is threaded in the sleeve 16 and permits grease to be injected into the sleeve.

The present invention does not attempt to claim the above described conventional and well known auxiliary steering arm construction which forms part of many General Motors, Ford, Nash, Packard, and Studebaker, both passenger automobiles and some light trucks and particularly Cadillac, Oldsmobile, Pontiac, Ford, Mercury, Lincoln, Nash, Packard, and Studebaker, but is merely a stabilizer to be used in conjunction therewith for reducing to a minimum the wear on the drag link and the steering link and also for relieving a certain amount of shock and strain through the entire system. The present invention also eliminates much steering wheel shock over rough roads and broken pavement.

To accomplish the above results, there is provided a coil spring 24 that yieldingly embraces the end portion 12 and which is biased between the shouldered portion 14 and the apertured end of the link 20.

A soft resilient, preferably rubber, protector sleeve 26 surrounds the coil spring 24. One end of the protector sleeve 26 abuts the link 20 and the other end of the sleeve 26 abuts the shouldered portion 14.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a vehicle including a cross rod having a threaded end and a shouldered portion adjacent the threaded end, an actuating arm having a threaded opening and a sleeve threaded in the opening and threaded on the threaded end of said rod, said sleeve having a reduced end projecting through the opening and toward the shouldered portion, the improvement of which comprises a coil spring embracing said threaded end and biased between said shouldered portion and said arm, said spring having an end embracing and contacting the reduced end of said sleeve, and a soft resilient collar about the spring and interposed between and contacting the arm and the shouldered portion.

JOHN J. SHEMORRY.

References Cited in the file of this patent

UNITED STATES PATENTS

| Number | Name | Date |
|---|---|---|
| 1,856,325 | Flentje | May 3, 1932 |
| 1,994,582 | Leighton | Mar. 19, 1935 |
| 2,291,112 | Slack | July 28, 1942 |
| 2,464,982 | Leighton | Mar. 22, 1949 |